Jan. 23, 1940.  J. BERTHIAUME  2,188,030
SLED BRAKE
Filed Aug. 29, 1938  2 Sheets-Sheet 1
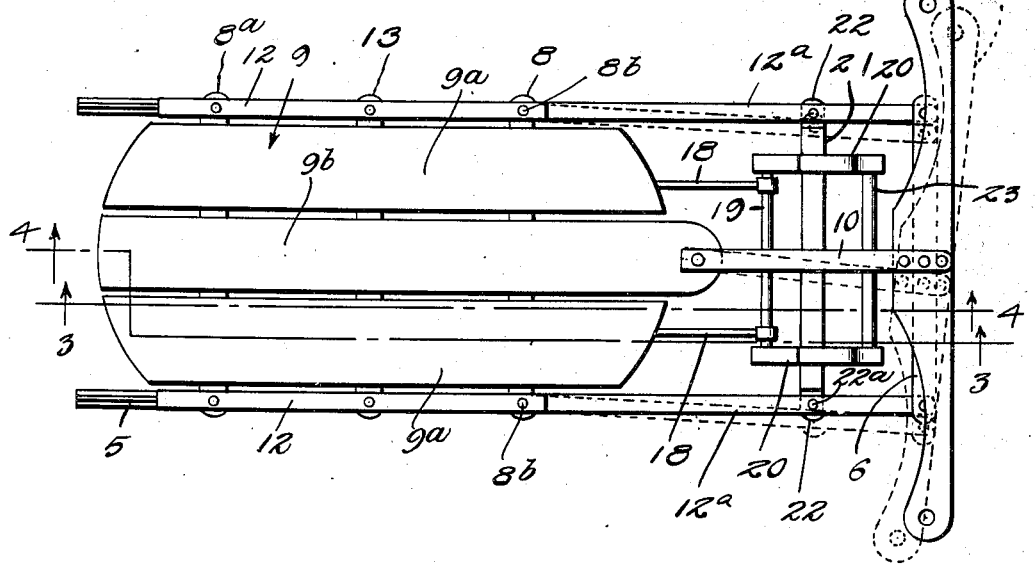
Fig. 1.
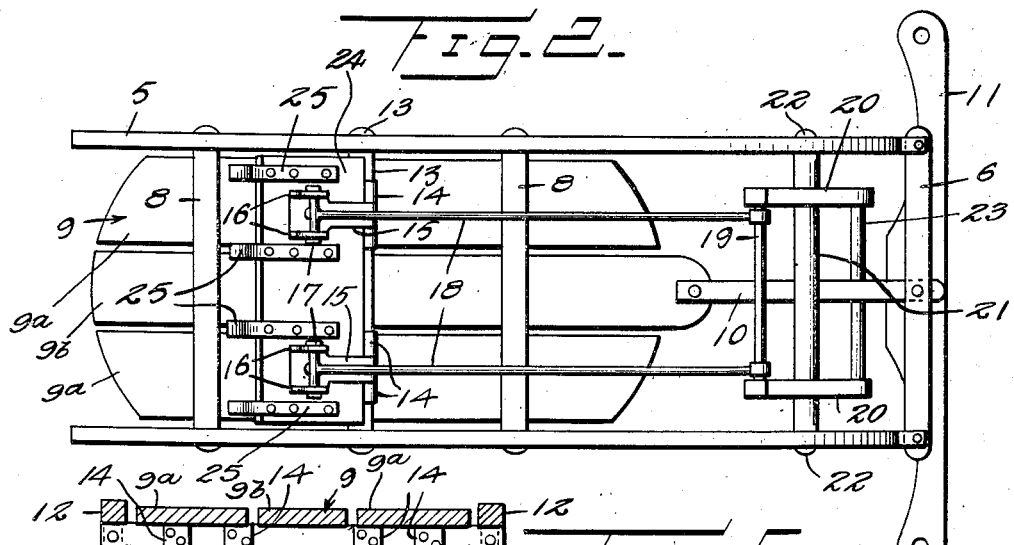
Fig. 2.
Fig. 6.
Joseph Berthiaume
INVENTOR
BY Victor J. Evans & Co.
ATTORNEYS

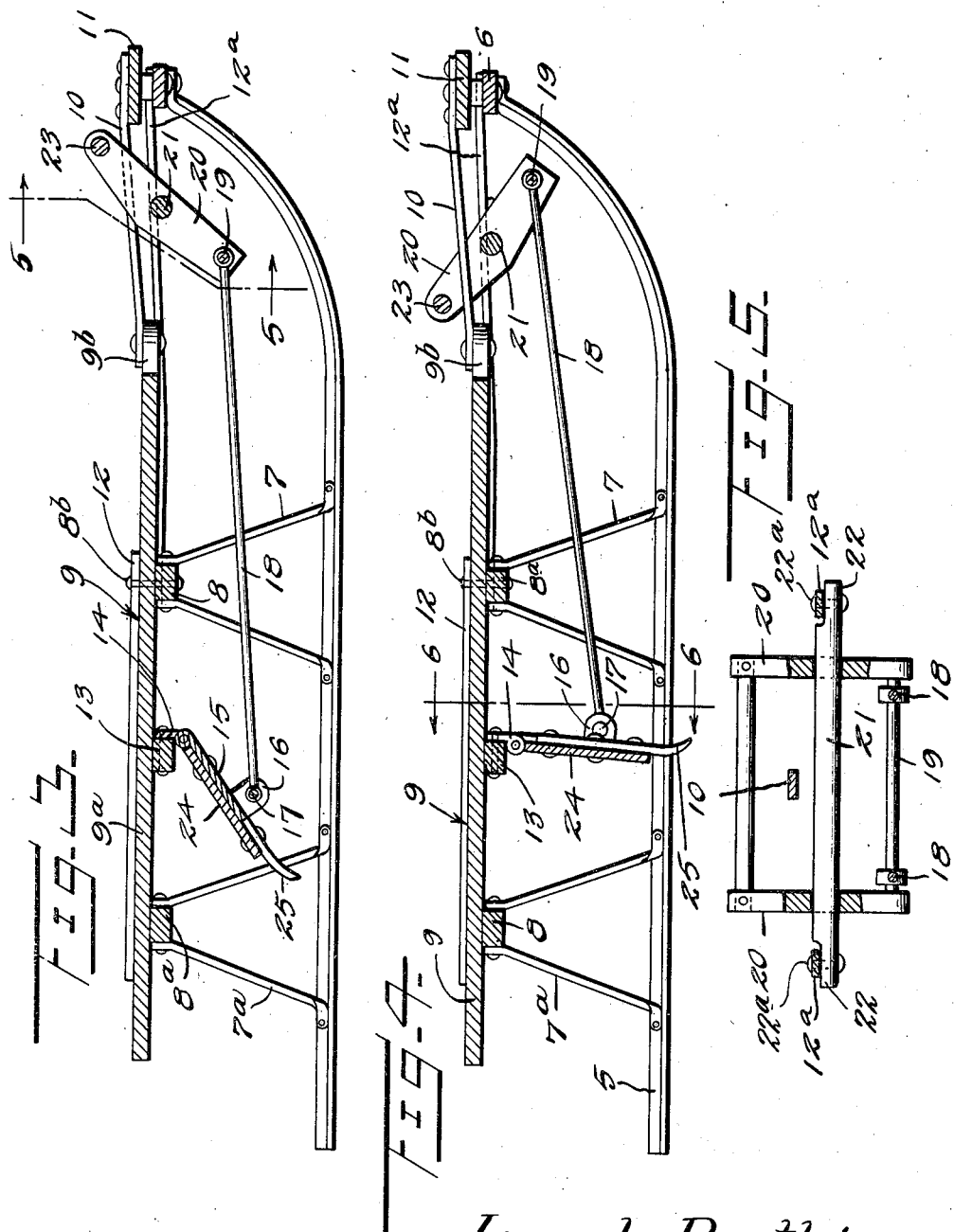

Patented Jan. 23, 1940

2,188,030

UNITED STATES PATENT OFFICE 2,188,030

SLED BRAKE

Joseph Berthiaume, Lawrence, Mass.

Application August 29, 1938, Serial No. 227,433

2 Claims. (Cl. 188—8)

My invention relates to improvements in sled brakes and has as one of the principal objects thereof the provision of a simple brake mechanism for effectively retarding the movement of the sled.

Another object of my invention is to provide a sled brake which is simple in construction, durable in use, efficient in operation and economical in manufacture.

Other objects and advantages will be apparent from the following description, appended claims and annexed drawings.

Referring to the drawings wherein like reference characters designate like parts throughout the several views:

Figure 1 is a top plan view of my invention.

Figure 2 is a bottom plan view thereof.

Figure 3 is a sectional view taken on the line 3—3 of Figure 1 illustrating the brake in non-braking position.

Figure 4 is a sectional view taken on the line 4—4 of Figure 1 illustrating the brake in braking position.

Figure 5 is a detail sectional view taken on the line 5—5 of Figure 3.

Figure 6 is a detail sectional view taken on the line 6—6 of Figure 4.

In practicing my invention I provide a sled of ordinary construction including a pair of laterally spaced runners 5, the forward ends of which are curved upwardly and are connected together by a transversely extending bar 6 pivoted to said forward ends. The horizontal sections of the runners have secured thereto front and rear pairs of spaced upwardly extending brackets 7 and 7a respectively, the upper ends of which are secured to the outer ends of transversely extending front and rear bars 8 and 8a respectively. Supported on said bars 8 and 8a and fixed thereto is a sectional centerboard 9, provided with spaced laterally and centrally disposed sections 9a and 9b respectively. The centrally disposed section 9b extends an appreciable distance beyond the lateral sections at the forward end of the latter and has pivoted thereto the rear end of a bar 10, the forward end of which is fixed to a transversely extending handle bar 11 pivotally mounted on the bar 6. Side rails 12 are mounted over the upper faces of the outer ends of the bars 8 and 8a and interposed between the side rails 12 and the bar 8 and pivoted thereto by means of rivets 8b are the rear ends of braces 12a, the front ends of which are pivoted to the upper front ends of the runners 5. Pivoting of the handle bar 11 serves to laterally displace the forward ends of the runners to effect steering of the sled in the usual manner. The foregoing description is typical of an ordinary sled construction and per se forms no part of the present invention.

To the under faces of the centerboard and the rails 12, between the bars 8 and 8a, I secure a transversely extending anchor bar or member 13 equipped on the front face thereof with spaced pairs of hinge sections 14 having pivoted thereto coacting depending hinge sections 15, the lower ends of which are fashioned with forwardly extending spaced ears 16 between which are pivotally connected as at 17 rearwardly extending ends of a pair of brake actuating rods 18.

The forward ends of said brake actuating rods 18 are pivotally connected to a transversely extending shaft 19, the ends of which are connected to the lower ends of a pair of spaced levers 20 pivotally and slidably mounted intermediate their ends on a transversely extending shaft 21 having outer ends 22 pivoted as at 22a to the lower faces of the braces 12a adjacent the front ends of the latter. The upper ends of the levers 20 are connected together by means of a brake operating handle 23. Secured to the rear faces of the hinged sections 15 and extending transversely of the sled is a plate 24 having fixed on the front face thereof a plurality of spaced brake members 25, the lower ends of which are tapered and forwardly curved to engage icy surfaces to effect braking of the sled when rearward pull is exerted on the handle 23 which causes downward pivoting of the plate 24. Reverse operation of the handle 23 serves to disengage the members 25 with an icy surface and position the plate 24 upwardly in non-brake applying position as clearly illustrated in Figure 3.

What I claim is:

1. In combination with a sled of that type equipped with a pair of spaced runners having upwardly extending front ends, a centerboard including side rails supported by and above said runners, a transverse member carried by said centerboard and remotely located with respect to said front ends, a pair of braces having rear ends pivotally connected to said rails and front ends pivotally connected to the front ends of said runners respectively; and a brake for said sled comprising a brake plate hinged to said transverse member, braking members fixed to said plate and having ends extending beyond said plate for engagement with the ground surface, a shaft having its ends pivotally connected to said braces for lateral movement therewith, a manually operated yoke slidably and pivotally mounted on said shaft, and brake rods pivotally connecting said plate to said yoke for moving said plate into braking position to effect engagement of the ends of said braking members with the ground surface upon actuation of said yoke.

2. In combination with a sled of that type equipped with a pair of spaced runners having upwardly extending front ends, a centerboard including side rails supported by and above said runners, a transverse member carried by said centerboard and remotely located with respect to said front ends, a pair of braces having rear ends pivotally connected to said rails and front ends pivotally connected to the front ends of said runners respectively; and a brake for said sled comprising a brake plate hinged to said transverse member, braking members fixed to said plate and having ends extending beyond said plate for engagement with the ground surface, a shaft having its ends pivotally connected to said braces for lateral movement therewith, a pair of spaced levers slidably and pivotally mounted on said shaft, a handle bar connecting said levers together for operating the same in unison, and brake rods pivotally connecting said plate to said levers for moving said plate into braking position to effect engagement of the ends of said braking members with the ground surface upon actuation of said levers.

JOSEPH BERTHIAUME.